United States Patent
Koscielniak (10) Patent No.: US 10,174,803 B2
(45) Date of Patent: Jan. 8, 2019

(54) HYDRAULIC BUFFER ASSEMBLY

(71) Applicant: ITT MANUFACTURING ENTERPRISES LLC, Wilmington, DE (US)

(72) Inventor: John T. Koscielniak, Blasdell, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 15/583,150

(22) Filed: May 1, 2017

(65) Prior Publication Data

US 2017/0314635 A1 Nov. 2, 2017

Related U.S. Application Data

(60) Provisional application No. 62/330,455, filed on May 2, 2016.

(51) Int. Cl.
| | |
|---|---|
| *F16F 9/516* | (2006.01) |
| *F16F 9/32* | (2006.01) |
| *F41A 3/90* | (2006.01) |
| *F41A 19/03* | (2006.01) |
| *F16F 9/348* | (2006.01) |

(Continued)

(52) U.S. Cl.
CPC ............ *F16F 9/516* (2013.01); *F16F 9/3228* (2013.01); *F16F 9/3487* (2013.01); *F16F 9/362* (2013.01); *F41A 3/90* (2013.01); *F41A 19/03* (2013.01); *F41B 11/70* (2013.01); *F41B 11/73* (2013.01); *F16F 2222/12* (2013.01); *F16F 2230/0088* (2013.01); *F16F 2230/30* (2013.01)

(58) Field of Classification Search
CPC . F16F 9/516; F16F 9/3228; F41A 3/90; F41A 19/03
See application file for complete search history.

(56) References Cited

U.S. PATENT DOCUMENTS

| | | | | |
|---|---|---|---|---|
| 1,351,141 | A | * | 8/1920 | Thompson ................ F41A 3/94 213/43 |
| 4,150,819 | A | * | 4/1979 | Taylor ..................... F41A 25/02 188/268 |

(Continued)

FOREIGN PATENT DOCUMENTS

| | | |
|---|---|---|
| DE | 687 499 C | 1/1940 |
| GB | 2 267 558 A | 12/1998 |

OTHER PUBLICATIONS

Invitation to Pay Additional Fees and, Where Applicable, Protest Fee and Partial Search Report; dated Sep. 7, 2017; 11 pages.

(Continued)

*Primary Examiner* — Thomas J Williams
*Assistant Examiner* — James K Hsiao
(74) *Attorney, Agent, or Firm* — Barclay Damon, LLP (57) ABSTRACT

A hydraulic buffer assembly for use in a paint gun includes a sealed housing having first and second ends and an interior including a chamber containing a hydraulic fluid. A piston assembly including at least one piston rod and a piston head is axially movable through the interior of the housing, wherein the piston head includes at least one orifice through which hydraulic fluid flows when the piston assembly is moved under load. The buffer assembly is configured to decrease or slow the firing rate of an automatic paint gun.

15 Claims, 5 Drawing Sheets

(51) Int. Cl.
*F16F 9/36* (2006.01)
*F41B 11/70* (2013.01)
*F41B 11/73* (2013.01)

(56) References Cited

U.S. PATENT DOCUMENTS

| | | | | |
|---|---|---|---|---|
| 6,758,126 B1* | 7/2004 | Houtsma | ............ | F41A 3/94 |
| | | | | 42/1.06 |
| 6,901,689 B1* | 6/2005 | Bergstrom | ............ | F41A 25/20 |
| | | | | 42/1.06 |
| 7,131,367 B1* | 11/2006 | Boerschig | ............ | F41A 3/94 |
| | | | | 89/198 |
| 7,343,844 B2* | 3/2008 | Poff, Jr. | ............ | F41A 3/94 |
| | | | | 89/191.01 |
| 7,681,351 B2* | 3/2010 | Bucholtz | ............ | F41C 23/06 |
| | | | | 42/1.06 |
| 8,156,929 B1* | 4/2012 | Gore | ............ | F41C 27/22 |
| | | | | 124/63 |
| 8,215,224 B1 | 7/2012 | Tortorici, Jr. et al. | | |
| 9,080,823 B1* | 7/2015 | Mantas | ............ | F41A 25/12 |
| 9,157,695 B1* | 10/2015 | Gore | ............ | F41B 11/642 |
| 9,746,279 B2* | 8/2017 | Dobbins | ............ | F41B 11/70 |
| 9,921,013 B1* | 3/2018 | Oglesby | ............ | F41A 3/80 |
| 2004/0154465 A1* | 8/2004 | Martin | ............ | F41A 25/02 |
| | | | | 89/42.01 |
| 2006/0236853 A1 | 10/2006 | Boersching et al. | | |
| 2010/0212648 A1 | 8/2010 | Tseng | | |

OTHER PUBLICATIONS

International Search Report and Written Opinion; dated Nov. 3, 2017; 15 pages.

* cited by examiner

HYDRAULIC BUFFER ASSEMBLY

CROSS REFERENCE TO RELATED APPLICATIONS

This application claims priority under relevant portions of 35 U.S.C. § 119 and 37 CFR § 1.53 to U.S. Patent Application No. 62/330,455, entitled: Hydraulic Buffer Assembly, filed May 2, 2016, the entire contents of which are incorporated by reference.

TECHNICAL FIELD

This application is generally directed to the field of buffer assemblies and more specifically to a hydraulic buffer assembly that is preferably configured for use in an automatic or semi-automatic paint ball gun or marker. The hydraulic buffer assembly produces a time delay or lag in order to effectively control the firing rate of the paint ball gun.

BACKGROUND

Paint ball guns or markers are commonly used for recreational purposes as well as for police and military training. Typically, a paint ball gun launches a projectile under force, typically using an expanding gas such as compressed air or carbon dioxide, at a muzzle velocity of approximately 90 m/sec (about 300 ft/sec). Upon impact with a target of interest, the projectile (paint ball) releases a stored quantity of brightly colored paint. Greater velocities can be achieved, but have been regulated due to safety concerns. Over time, these devices have become fairly sophisticated and complex, wherein semi-automatic and automatic versions have been developed, and in which the firing or burst rate has also seen significant increases. For example, some paint guns are capable of firing up to thirty (30) rounds per second.

Specific regulations in various states in the United States, as well as different foreign countries dictate that the firing rate of automatic paint ball guns or markers must be controlled within specific maximums, in the interest of safety. Accordingly, there is a need in the field to provide a buffer assembly that can be incorporated into new or existing paint guns or markers in order to slow the firing rate of an automatic paint gun within the promulgated standards. Though electronic versions having complex circuitry have been developed, to date, Applicant is unaware of a hydraulic buffer being configured for incorporation or inclusion within a paint ball gun.

BRIEF DESCRIPTION

According to a first aspect, there is provided a buffer assembly for creating a time delay upon receipt of an inputted load or force while maximizing the receipt of a return force. The apparatus includes a housing having a first end and a second end with a piston assembly extending within an interior of the housing. The piston assembly includes an orificed piston head that moves a contained hydraulic fluid based on the stroke of the piston upon receipt of an applied load, the movement of hydraulic fluid creating a time delay to the inputted load or force. The piston assembly also includes a check valve for fast return of the piston assembly in the opposite direction so that the buffer assembly is ready to provide a time delay for the next firing cycle. In at least one version, the above assembly can be used within a paint ball gun and more specifically, an automatic paint ball gun for purposes of controlling firing rate.

According to one version, the piston assembly includes a first piston rod and a second piston rod secured together axially, as well as a glide ring and a seal retainer, each disposed between the piston head and an interior wall of the housing.

In at least one embodiment, the glide ring and seal retainer include through openings aligned with one another and the orifices of the piston head that permit the passage of hydraulic fluid when the piston assembly is moved through the interior of the housing under load.

The first piston rod can include a narrowed end portion that is secured within an opening of the second piston rod and in which the second piston rod is secured to the seal retainer, the seal retainer being configured for movement with the piston assembly.

The glide ring is preferably disposed between the piston head and the seal retainer and is disposed for movement based on movement of the piston assembly. According to one version, the buffer assembly includes a pair of quad rings that are fixedly secured within the interior of the housing within spaced regions, each of the spaced regions being smaller than the quad rings and therefor compressing same.

In at least one version, the orifices of the piston head include at least one check valve and in which the seal retainer has an outer diameter that is smaller than an inner diameter of the housing, thereby creating an annular space for moving hydraulic fluid.

The piston head can be defined with an outer diameter that is smaller than an inner diameter of the housing, thereby creating an annular space for moving hydraulic fluid in addition to the orifices, when the at least one check valve is open.

The glide ring can be defined by an outer diameter that almost matches the inner diameter of the housing to act as a seal on the inner diameter of the housing, the glide ring including an opening to permit the passage of hydraulic fluid for buffering purposes.

According to another aspect, there is provided a method for slowing the firing rate of an automatic paint gun, the method comprising:
  providing a housing secured within the paint gun having first and second ends and an interior including a chamber containing a hydraulic fluid;
  providing a piston assembly including a pair of piston rods and a piston head that is axially movable through the interior of the housing, the piston head including at least one orifice; and
  applying a load attributable to firing the paint ball gun to a first piston rod, causing hydraulic fluid to be moved through the orifices of the piston head and damping the assembly by controlling the velocity of the buffer when being stroked in one direction during the firing and return cycle of the gun, causing a time delay and thus slowing the firing rate.

In one version, the piston assembly includes the pair of piston rods that are attached to one another at opposing ends, in which the pair of piston rods are configured to move in tandem. A piston head attached to one of the piston rods includes a set of orifices through which hydraulic fluid moves when the piston head is advanced.

One advantage realized by the herein described design is that the firing rate of an automatic firearm, such as a paint ball gun, can be more effectively and mechanically controlled, as opposed to electronic means as conventionally employed, the latter being less reliable, more complex and expensive and also requiring electric power.

Another advantage of the herein described design is that the buffer assembly is sufficiently compact to fit within a very small area of the gun. As a result, the overall footprint of the gun is not compromised or effected.

These and other features and advantages will be readily apparent from the following Detailed Description, which should be read in conjunction with the accompanying drawings.

BRIEF DESCRIPTION OF THE DRAWINGS

Various features and advantages of the present invention will become more apparent when taken in conjunction with the following description and drawings wherein identical reference numerals have been used, where possible, to designate identical features that are common to the figures, and wherein.

DETAILED DESCRIPTION

The following discussion describes a hydraulic buffer assembly or apparatus that is made in accordance with a specific embodiment. It will be understood, however, that various modifications and variations can be made within the ambits of the herein described concept. In addition, certain terms such as "first", "second", "inner", "outer", "above", "below", "left", "right", "interior", "exterior", and the like are used throughout the course of discussion in order to provide an suitable frame of reference with regard to the accompanying drawings. It should be noted, however, that these terms, unless specifically indicated otherwise, are also not intended to narrow the scope of the invention. In addition, similar parts described in the various views are labeled with the same reference numbers for the sake of clarity and understanding.

Figure 1:
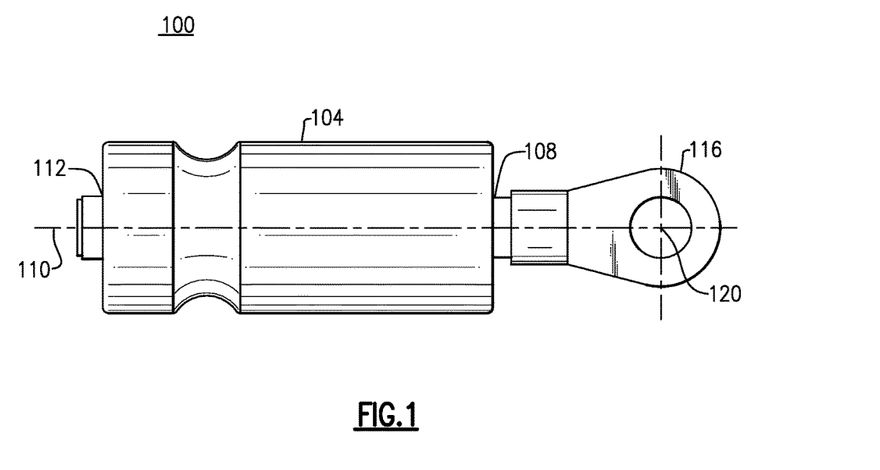
FIG. 1 is a side elevational view of a hydraulic buffer assembly in accordance with an embodiment.

With reference to FIG. 1, there is depicted a hydraulic buffer assembly 100 defined by a substantially cylindrical assembly housing 104 having respective first and second ends 108, 112 and a center axis 110. A clevis or similar connecting member 116 is attached relative to the first end 108 of the housing 104. According to this described embodiment, the clevis 116 includes a center hole or opening 120.

Figure 2:
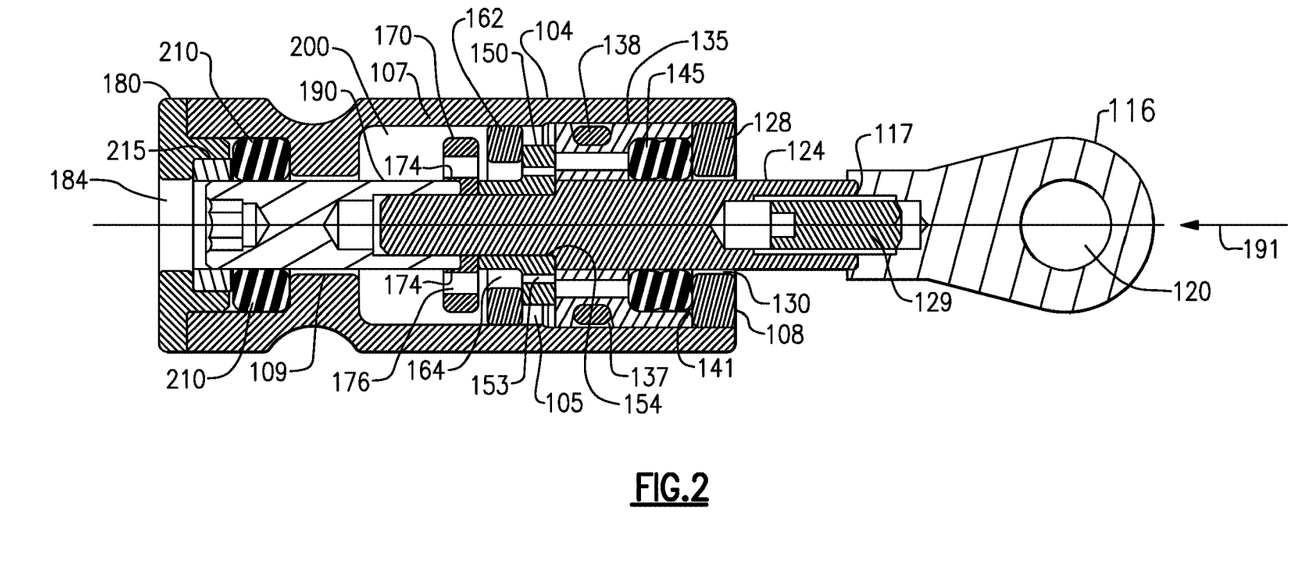
FIG. 2 is the side elevational view, taken in section, of the hydraulic buffer assembly of FIG. 1 in a first or expanded position.

Referring to FIGS. 1 and 2, the housing 104 is defined by an interior 105 wherein the clevis 116 is fixedly attached to a piston assembly and more specifically an extending end of a first piston rod 124. A set screw 129 is fitted within respective end openings of the clevis 116 and the first piston rod 124, wherein the end of the clevis 116 includes an annular shoulder 117 that engages the end of the first piston rod 124 to reliably position or seat same.

The interior 105 of the assembly housing 104 is substantially hollow and is sized and configured to retain a plurality of components of the herein described hydraulic buffer assembly 100. A retainer 128 is disposed in the interior 105 of the assembly housing 104 at the first end 108. The retainer 128 includes a center opening 130 that is sized and configured to receive the first piston rod 124 and in which an outer wall of the retainer 128 is pressed flush with an interior or inner wall 107 of the assembly housing 104. Adjacent the retainer 128 and contained within the housing interior 105 is a front bearing assembly 135 that is sealingly and fixedly engaged with the inner wall 107 of the assembly housing 104.

According to this embodiment, the bearing assembly 135 includes an annular recess 137 that is sized and configured to retain a sealing ring 138, the latter preferably being elastomeric in nature which is disposed within the recess 137 and in sealing contact with the inner wall 107 of the assembly housing 104. The bearing assembly 135 further includes a center opening 139 that is sized and configured to permit the passage of the first piston rod 124 and in which the bearing assembly 135 otherwise essentially fills the interior space of the assembly housing 104 at the first end 108, with the exception of a recessed portion 141 adjacent the retainer 128 that receives a quad ring 145.

Figure 3:
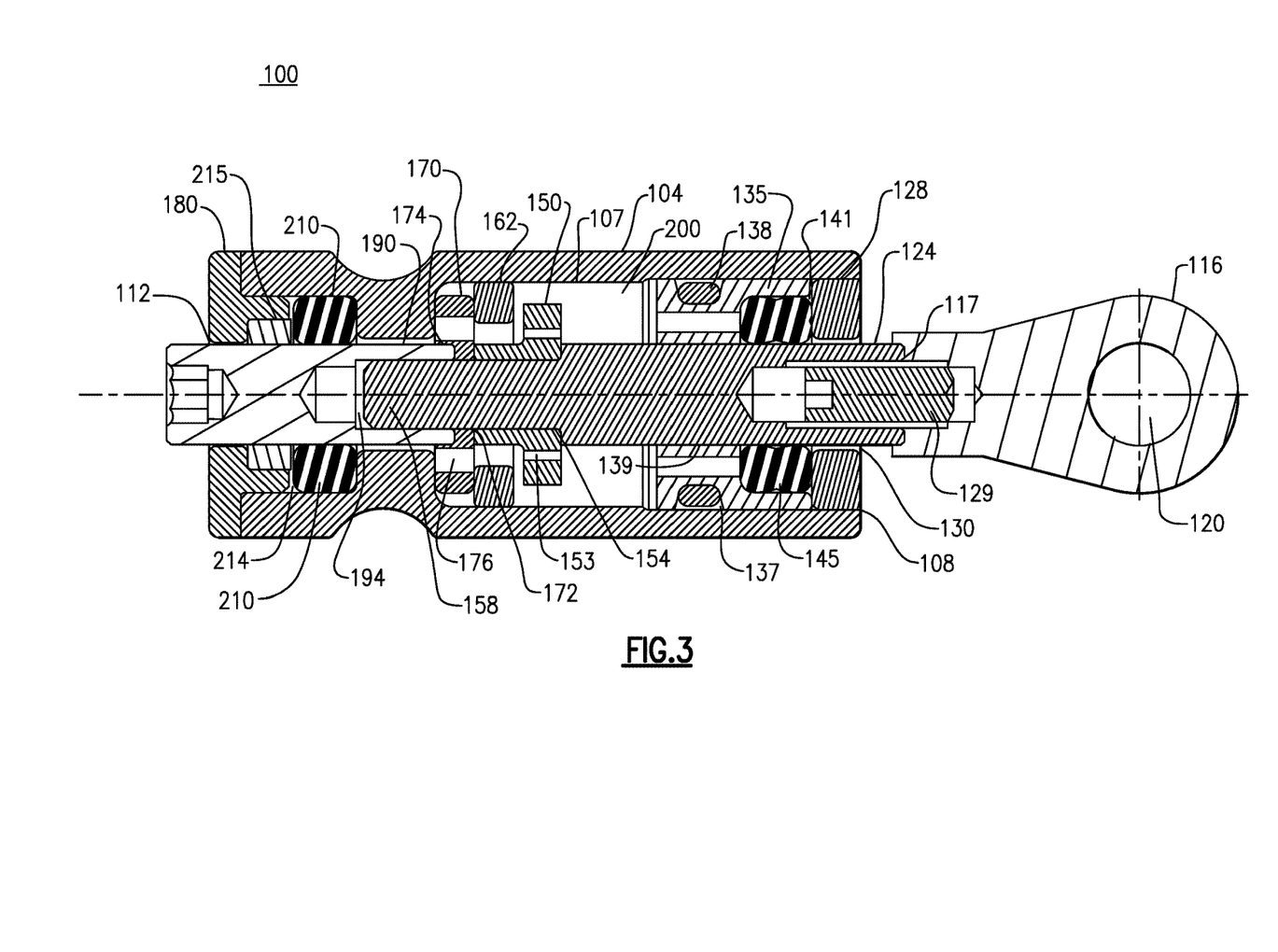
FIG. 3 is the side elevational view of FIG. 2 of the hydraulic buffer assembly in a second or compressed position.

As shown in the sectioned view according to FIGS. 2 and 3, the recessed portion 141, the outer wall of the first piston rod 124, and an interior wall of the retainer 128 combine to define a spaced region that fully encloses the quad ring 145. According to this embodiment, the size of this latter defined spaced region is preferably smaller than the quad ring 145 in order to create an interference fit and induce compression.

The piston assembly further includes a piston head 150 that is secured to a shoulder of the first piston rod 124, the latter being axially movable along with the first piston rod 124 and attached fixedly thereto. According to this embodiment, the piston head 150 is defined by a cylindrical body including an outer diameter that is smaller than that of the inner surface 107 of the housing 104, thereby forming an annular gap. The piston head 150 further includes a center opening 154 that receives a narrowed diametrical portion 158 of the first piston rod 124 that further passes thorough an opening 164 formed in an adjacent glide ring 162. An expanded portion of the piston head 150 retained against the shoulder of the first piston rod 124 includes a set of axially disposed orifices 153. According to this embodiment, the orifices 153 are radially disposed beyond the first piston rod 124 such that the orifices 153 extend through the entirety of the expanded portion. A narrowed portion of the first piston head 124 extends axially from the expanded portion, the latter having a smaller outer diameter.

Still referring to FIGS. 2 and 3 and according to this embodiment, the glide ring 162 has an outer diameter that almost matches the inner diameter of the assembly housing 104 and in which the narrowed diametrical portion 158 of the first piston rod 124 further extends through the formed center opening 172 of a seal retainer 170 adjacent the glide ring 162. The seal retainer 170 receives the smaller diametrical portion 158 of the first piston rod 124, the latter passing through the formed center opening 172. In addition and according to this embodiment, the seal retainer 170 includes a recessed portion 174 on a facing surface closest to the second end 112 of the housing 104 that is sized to receive the end of a separately attached second piston rod 190, as well as an annular passage 176.

According to this embodiment, the second end 112 of the assembly housing 104 includes a spacer 180 that is press fitted to the inner surface 107 of the assembly housing 104. The spacer 180 is fixedly attached to the assembly housing 104 and is defined by a center opening 184 through which extends the second piston rod 190, the latter being part of the piston assembly and having an end opening 194 that is sized to accommodate the end of the narrowed diametrical portion 158 of the first piston rod 124. The piston rod 190 which is also axially movable extends through an opening 109 formed in the interior wall 107 of the housing 104 and extends into a chamber 200 filled with a hydraulic fluid, such as a silicone fluid.

A quad ring 210 is disposed within a fixed spaced region 214 defined between the spacer 180, the outer surface of the second piston rod 190, and an interior wall of the housing 104. As in the first end 107, the defined spaced region is smaller than the outer dimensions of the quad ring 210, thereby creating an interference fit and compression of the fitted quad ring 210. The quad rings 145, 210, which as previously noted are preferably compressed into their respective cavities form seals for the hydraulic chamber 200 within the interior of the assembly housing 104. A rear bearing 215 is housed within the spacer 180 to support the second piston rod 190.

The overall operation of the hydraulic buffer assembly 100 is further discussed with reference to FIGS. 2 and 3. The assembly 100, as shown in section, is depicted in an initial or extended position according to FIG. 2. An axial load is applied or otherwise imparted to the clevis 116 (see arrow 191, representative of the movement of the bolt (not shown) of the paint gun (not shown)) that causes the attached first piston rod 124 and the clevis 116 in unison to move toward the second end 112 of the assembly housing 104. The first piston rod 124 axially advances through the front bearing assembly 135 wherein the orificed piston head 150 is also caused to move axially toward the second end 112 of the housing 104. The orificed piston head 150 sequentially engages the glide ring 162 and seal retainer 170, wherein the second piston rod 190 is axially advanced through the second end 112 of the housing 104 to the compressed position shown in FIG. 3. During compression, the glide ring 162 moves to seal against the front face of the piston head 150, as shown in FIG. 2. The glide ring 162 acts as a check valve.

The contained hydraulic fluid is moved during this part of the operation through the orifices 153 of the piston head 150. Overall, the hydraulic fluid is first guided through a path through the defined annular passages 176 of the seal retainer 170 and around the outside diameter of the seal retainer 170, through the inner opening 164 of the glide ring 162. The fluid is then moved through the orifices 153, but only as a result of the glide ring 162 having sealed against the front face of the piston head 150, thereby sealing the annular gap formed on the piston head 150 between the outer surface of the piston head 150 and the inner surface of the housing 104. At the end of the stroke, the seal retainer 170 engages the interior wall 107 of the housing 104, as shown in FIG. 3, with an end of the second piston rod 190 outwardly extending from the second end 112 of the housing 104.

With continued reference to FIGS. 2 and 3 and according to this embodiment, a restoring force can be provided to the herein described buffer assembly 100. For example, a spring (not shown) can be configured to engage the end of the second piston rod 190 in order to drive the second piston rod 190 and the attached seal retainer 170 against the piston head 150 toward the first end 108 of the assembly 100. Hydraulic fluid contained within the defined chamber 200 is moved around the annular gap and through the orifices 153 formed in the piston head 150 without the delay previously caused by the check valve (i.e., check valve is open) as the glide ring 162 engages the inner wall of the housing 104. The hydraulic fluid is moved through the inner opening 164 of the glide ring 162 and then through the annular passage 176 of the seal retainer 170, with the first piston rod 124 and the clevis 120 being returned to the initial position of FIG. 2. According to this embodiment, the overall stroke of the depicted buffer assembly 100 is about 0.120 inches, although this parameter can be suitably varied depending on the application and paint gun. As such, the clevis 116 can be quickly moved from the compressed position of FIG. 3 to the initial extended position of FIG. 2, as aided by the opened check valve wherein the contained hydraulic fluid is more quickly moved to advance the hydraulic buffer assembly 100.

Figure 4:
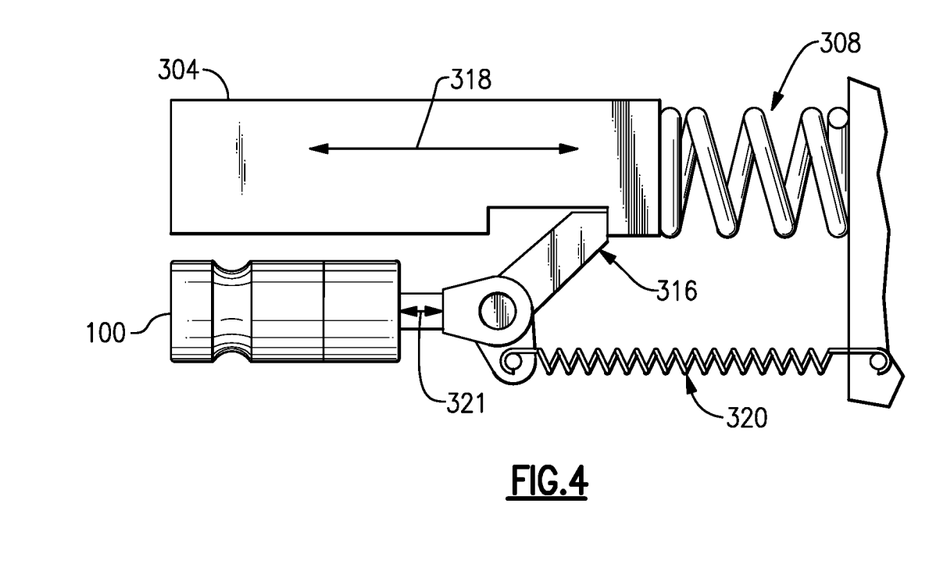
FIG. 4 depicts a buffer assembly shown schematically in connection with a paint gun.
Figure 5:
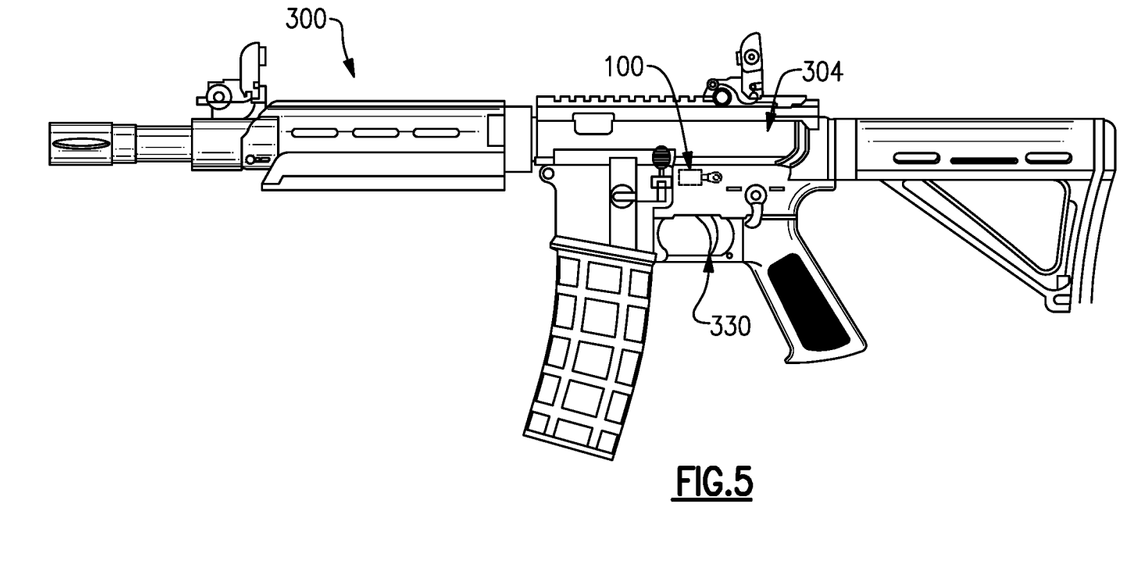
FIG. 5 is a side elevational view of a paint gun that is configured for use with a buffer assembly in accordance with an embodiment.

An exemplary representation of a buffer assembly 100 as used in a paint gun is shown schematically in FIG. 4, the paint gun 300 being shown more completely in FIG. 5. The buffer assembly 100 is extremely compact and therefore takes up little room. One preferred location of the buffer assembly 100 is shown in phantom in FIG. 5. With reference to FIG. 4 and according to this schematic representation, the bolt assembly 304 of the paint gun 300 is translatably movable per arrow 318 within a defined chamber and biased by means of a bolt spring 308. The bolt assembly 304, according to this embodiment, is mounted in parallel with the buffer assembly 100 by means of a pivoting assembly 316. According to this embodiment, one end of the pivoting assembly 316 is maintained in contact with a portion of the movable bolt assembly 304. The remaining end of the pivoting assembly 316 is rotatably attached to the clevis end 116, FIG. 2, of the buffer assembly 100 and the contained movable piston assembly, see arrow 321. A tension return spring 320 having one end operatively coupled to the buffer assembly 100 is configured for supplying the restoring force thereto. The remaining end of the tension return spring 320 and the bolt spring 308 are fixedly attached to structure within the paint gun 300.

With reference to FIGS. 1-5, the translatable movement of the bolt assembly 304 between its firing and return cycles creates corresponding movement of the attached pivoting assembly 316 and therefore the buffer assembly 100 between the initial extended position of FIG. 2 and the compressed position of FIG. 3. Damping occurs during the compression of the buffer assembly 100, while free flow of the hydraulic fluid occurs as the buffer assembly 100 is moved to the extended position as aided by the tension return spring 320. As a result, the firing rate of the paint gun 300 upon depression of the trigger 330 can be effectively controlled.

PARTS LIST FOR FIGS. 1-5

100 hydraulic buffer assembly
104 housing, assembly
105 interior, housing
107 interior wall, housing
108 first end, housing
109 opening
110 axis, housing
112 second end, housing
116 clevis or connecting member
117 shoulder, clevis end
120 center hole or opening
124 first piston rod
128 retainer 129 set screw
130 center opening, retainer
135 bearing assembly
137 recess
138 sealing ring
139 center opening, bearing assembly
141 recessed portion, bearing assembly
145 quad ring
150 piston head
153 orifices, piston head
154 center opening
158 narrowed diametrical section
162 glide ring
164 inner opening, glide ring
170 seal retainer
172 center opening, seal retainer
174 recessed portion
176 annular passage, seal retainer
180 spacer
184 center opening, spacer
190 second piston rod
191 arrow
194 opening, second piston rod
200 chamber, hydraulic
210 quad ring
214 fixed space region
215 rear bearing
300 paint gun
304 bolt assembly
308 bolt spring
316 pivoting assembly
318 arrow, movement
320 tension return spring
321 arrow, movement
330 trigger The invention is inclusive of combinations of the aspects described herein. References to "a particular aspect" (or "embodiment" or "version") and the like refer to features that are present in at least one aspect of the invention. Separate references to "an aspect" or "particular aspects" or the like do not necessarily refer to the same aspect or aspects; however, such aspects are not mutually exclusive, unless so specifically indicated or as are readily apparent to one of skill in the field. The use of singular or plural in referring to "method" or "methods", and various components of the herein described assembly and the like is not intended to be overly limiting. The word "or" is used in this disclosure in a non-exclusive sense, unless explicitly noted.

This invention has been described in detail with particular reference to certain aspects thereof. It will be readily apparent and understood that variations, modifications, and combinations can be effected by a person of ordinary skill within the intended scope of the invention and in accordance with the following claims.

The invention claimed is:

1. A hydraulic buffer assembly for use in a paint gun, the buffer assembly comprising:
an assembly housing configured to be disposed within the paint gun, the assembly housing having opposing first and second ends and an interior including a chamber containing a quantity of a hydraulic fluid;
a piston assembly including at least one piston rod and a piston head axially movable through the interior of the assembly housing, the piston head being sized or including at least one orifice through which hydraulic fluid is configured to move through and around the piston head when the piston assembly is under load, the piston assembly being configured to stroke a set distance within the paint gun in a set time during the firing and reset cycle in order to slow the firing rate thereof; and
a glide ring movably disposed on a narrowed portion of the piston head within the interior of the assembly housing, the glide ring having at least one through opening aligned with the at least one orifice of the piston head and an outer diameter that essentially matches the interior diameter of the assembly housing, in which the glide ring is axially movable to seal against the piston head to prevent fluid from moving around the piston head and only through the at least one orifice of the piston head when the piston assembly is moved in a first axial direction and in which the glide ring is spaced away from the piston head to permit the hydraulic fluid to move around the piston head and through the aligned at least one opening of the glide ring and the at least one orifice of the piston head when the piston assembly is moved in a second axial direction opposite the first axial direction.

2. The hydraulic buffer assembly as recited in claim 1, wherein the piston assembly includes a first piston rod and a second piston rod secured together axially.

3. The hydraulic buffer assembly as recited in claim 1, including a a seal retainer disposed between the glide ring and an interior wall of the assembly housing.

4. The hydraulic buffer assembly as recited in claim 3, wherein the seal retainer includes at least one through opening aligned with the at least one through opening of the glide ring and the at least one orifice of the piston head to permit the passage of hydraulic fluid when the piston assembly is moved through the interior of the assembly housing under load.

5. The hydraulic buffer assembly as recited in claim 4, in which the seal retainer has an outer diameter that is smaller than an inner diameter of the assembly housing, thereby creating an annular space for moving hydraulic fluid.

6. The hydraulic buffer assembly as recited in claim 4, in which the first piston rod includes a narrowed end portion that is secured within an opening of the second piston rod.

7. The hydraulic buffer assembly as recited in claim 6, in which the second piston rod is secured to the seal retainer, the seal retainer being configured for movement with the piston assembly.

8. The hydraulic buffer assembly as recited in claim 1, including at least one seal element.

9. The hydraulic buffer assembly as recited in claim 8, in which the at least one seal element includes a pair of quad rings fixedly secured within the interior of the assembly housing within spaced regions, each of the spaced regions being smaller than the quad rings and therefor compressing the quad rings.

10. The hydraulic buffer assembly as recited in claim 1, in which the orifices of the piston head include at least one check valve.

11. A hydraulic buffer assembly comprising:
an assembly housing having opposing first and second ends and an interior including a chamber containing a quantity of a hydraulic fluid;
a piston assembly including a first piston rod and a second piston rod disposed serially and a piston head, the piston assembly being configured for axial movement through the interior of the assembly housing, the piston head being sized or including at least one orifice through which hydraulic fluid is configured to move through or around the piston head when the piston assembly is under load; and a glide ring movably disposed on a narrowed portion of the piston head, the glide ring having at least one through opening aligned with the at least one orifice of the piston head and having an outer diameter that substantially matches an inner diameter of the interior of the assembly housing, wherein the glide ring is caused to seal against the piston head and prevent hydraulic fluid from moving around the piston head and only through the at least one orifice when the piston assembly is moved in a first axial direction and in which hydraulic fluid is permitted to move around and through the piston head when the piston assembly is moved in an opposing second axial direction.

12. The hydraulic buffer assembly as recited in claim 11, in which the glide ring functions as a check valve for the movement of hydraulic fluid.

13. The hydraulic buffer assembly as recited in claim 12, in which the seal retainer is secured to the second piston rod and is sized smaller than the inner diameter of the assembly housing to permit hydraulic fluid to flow around and through the seal retainer and in which the seal retainer is movably disposed within the interior of the assembly housing.

14. The hydraulic buffer assembly as recited in claim 11, further comprising a seal retainer disposed within the interior of the assembly housing between the glide ring and an interior wall of the assembly housing, the seal retainer including at least one through opening aligned with the at least one through opening of the glide ring and the at least one orifice of the piston head.

15. The hydraulic buffer assembly as recited in claim 11, in which the hydraulic buffer assembly is configured for use in a paint gun.

* * * * *

UNITED STATES PATENT AND TRADEMARK OFFICE
CERTIFICATE OF CORRECTION

PATENT NO. : 10,174,803 B2
APPLICATION NO. : 15/583150
DATED : January 8, 2019
INVENTOR(S) : John T. Koscielniak Page 1 of 1

It is certified that error appears in the above-identified patent and that said Letters Patent is hereby corrected as shown below:

In the Claims

Claim 3:
Column 8
Line 26, please change "including a a seal retainer disposed between the glide ring" to --including a seal retainer disposed between the glide ring--

Claim 13:
Column 10
Line 1, please change "13. The hydraulic buffer assembly as recited in claim 12," to --14. The hydraulic buffer assembly as recited in claim 13,--

Claim 14:
Column 10
Line 7, please change "14. The hydraulic buffer assembly as recited in claim 11," to --13. The hydraulic buffer assembly as recited in claim 11,--

Signed and Sealed this
Seventh Day of May, 2019

Andrei Iancu
*Director of the United States Patent and Trademark Office*